Aug. 16, 1949.  W. E. RANDALL, JR  2,478,981
NAVIGATION APPARATUS
Filed Jan. 18, 1945  2 Sheets-Sheet 1
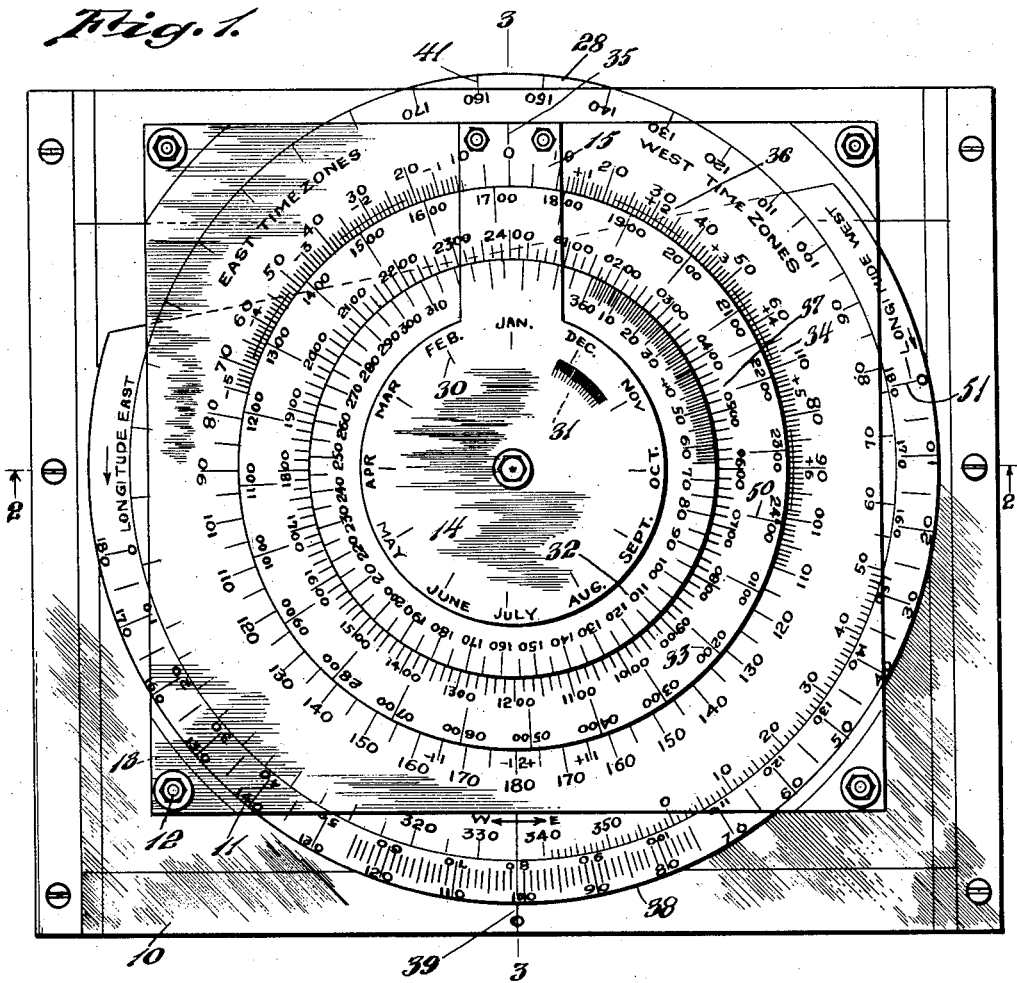
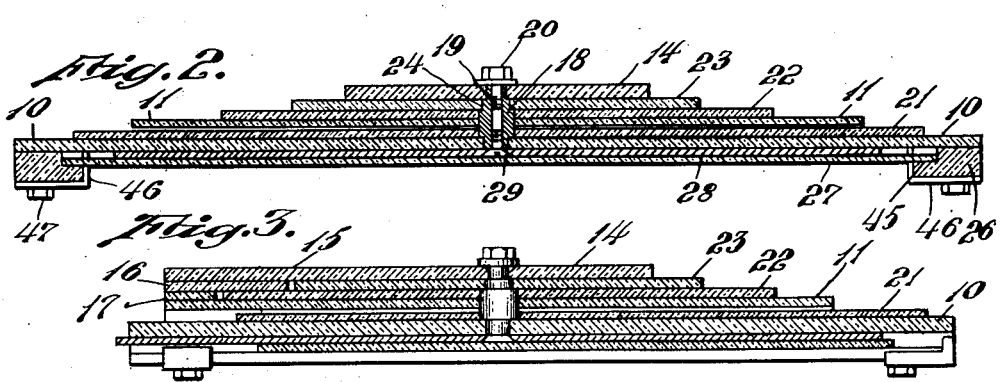
INVENTOR
Waldo Emerson Randall Jr.
BY Barlow & Barlow
ATTORNEYS Aug. 16, 1949.    W. E. RANDALL, JR    2,478,981
NAVIGATION APPARATUS Filed Jan. 18, 1945    2 Sheets-Sheet 2

INVENTOR
Waldo Emerson Randall Jr.
BY Barlow & Barlow
ATTORNEYS

Patented Aug. 16, 1949

2,478,981

UNITED STATES PATENT OFFICE 2,478,981

NAVIGATION APPARATUS

Waldo Emerson Randall, Jr., Cranston, R. I.

Application January 18, 1945, Serial No. 573,446

6 Claims. (Cl. 35—44)

This invention relates to celestial navigation and more particularly to an apparatus for identifying a celestial body and for determining therefrom the observer's position on or above the earth's surface.

According to a standard method of determining the position of a vessel at sea or in the air, the altitude and azimuth of a known celestial body are observed, and the sidereal time of the prime meridian, as shown by the sidereal time chronometer of the vessel, is noted. The navigator then, by dead reckoning, calculates the estimated altitude of the celestial body observed and, by a standard method (for example by the method of St. Hilaire) a line of position, or Sumner line, is determined. The ship is then known to be at some point on this line of position, and if a second line of position is established by means of a second observation made on a different celestial body, or a subsequent observation on the same celestial body, from a different position, as after the ship has travelled a certain distance from the point where the first observation was taken, the intersection of the two lines of position, after correction for the travel of the ship between the times of the two observations, indicates the position of the ship at the time of said second observation.

In order to establish a line of position, it is necessary first to identify the celestial body observed, and second, to calculate the estimated altitude of such body at the instant of observation, the estimated altitude being the altitude at which the body would have been observed if the ship had actually been at the position estimated by dead reckoning. Various devices have heretofore been employed to assist the identification of an observed celestial body. One of such devices is furnished by the Hydrographic Office HO No. 2102-B known as the "Rude starfinder and identifier" and comprises a projection or diagram of the sky and a plurality of projections of the local sphere, or earth, prepared for different latitudes, the latter projections being inscribed on transparent sheets. By selecting the terrestrial projection suitable for the observer's estimated latitude, and orienting it with respect to the celestial projection, it is possible to identify any observed celestial body which is inscribed on the celestial projection.

It is an object of the present invention to provide an apparatus which is adapted not only to enable the navigator to readily identify an observed celestial body, but also to read directly its estimated altitude.

Another object is the provision of an apparatus of the type mentioned, in which the necessary manipulation of the stereographic projections is effected mechanically, the extent of such manipulating being simultaneously registered by means of registering devices of the disc type, so that the possibility of error is substantially eliminated.

Another object of this invention is to provide an apparatus whereby a nautical almanac or other book need not be used but rather the apparatus is one by which data usually obtained may all be obtained from the apparatus.

Another object of this invention is to provide a device which is flat and may be easily carried in a brief case or even with papers in the same manner that papers are handled.

Another object of this invention is to provide a device which may be easily handled and held in the hands and manipulated in the hands without any firm or rigid support.

Another object of this invention is to provide an instrument which consists of superimposed discs or plates such as thin sheets of celluloid or the like.

With these and other objects in view, the invention consists of certain novel features of construction, as will be more fully described and particularly pointed out in the appended claims.

In the accompanying drawings:

Fig. 1 is a top plan view of the apparatus;

Fig. 2 is a sectional view on substantially line 2—2 of Fig. 1 and somewhat exaggerated as to thickness;

Fig. 3 is a section on line 3—3 of Fig. 1 with the same exaggeration;

Figure 4:
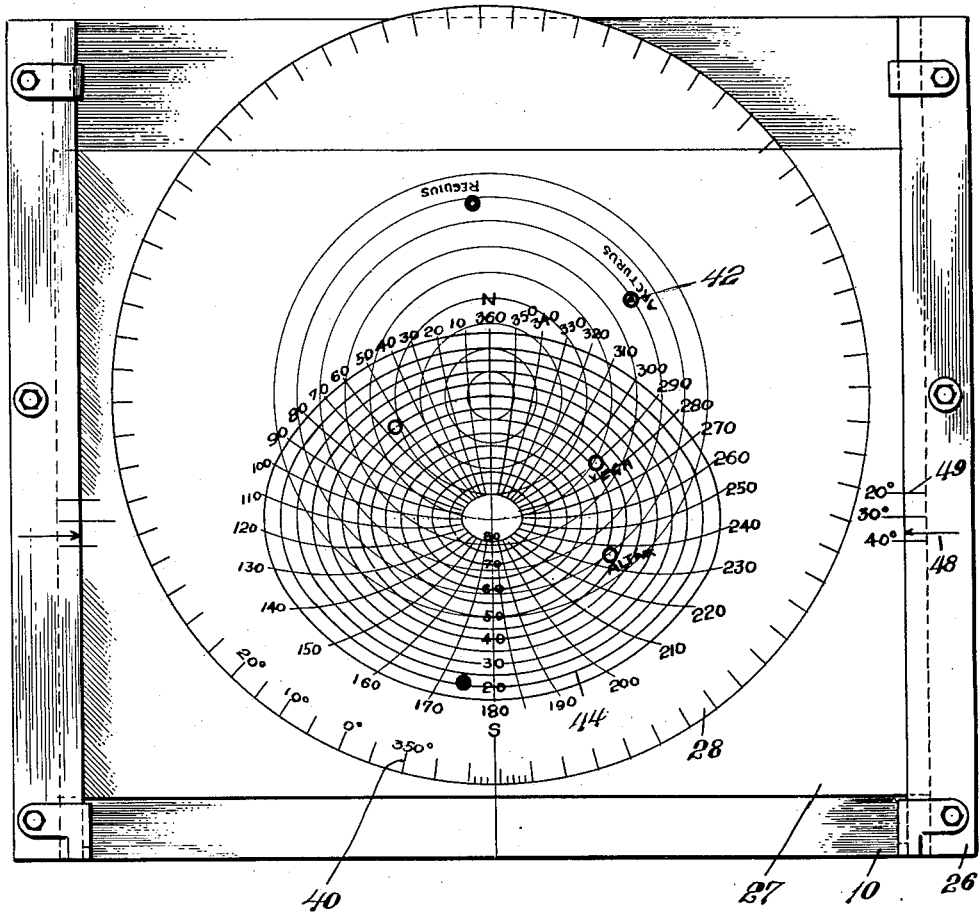
Fig. 4 is a rear plan view showing the stereographic projection of substantially 40° latitude superimposed upon the stereographic projection of the celestial sphere showing navigational stars.

In accordance with the method of the present invention a stereographic projection of the celestial sphere and a stereographic projection of the terrestrial sphere are superimposed, and are then adjusted relatively as a function of the sidereal time of the prime meridian and the estimated longitude of the navigator's position, which enables identification of an observed heavenly body by means of coordinates inscribed on the terrestrial projection. At the same time the estimated altitude and the true azimuth of the observed body may be read from the apparatus. The position of bodies in the celestial sphere (referring particularly to those which are commonly used in navigating, and are hereinafter referred to as "navigating stars") is usually defined by means of their horary coordinates, or right ascension and declination. The right ascension is the angle comprised between the semi-major circle or celestial meridian passing through the first point of Aries and that on which the body or star is located. The declination of a star is the distance from the star to the celestial equator measured on the circle of declination, that is, the great circle which passes through the star and through the poles of the celestial sphere.

The present invention employs a plurality of stereographic projections of the earth's surface, made according to different latitudes, such projections being taken on a plane parallel to that of the equator. Each such projection will consist of a series of arcs designating azimuths and a series of circles or arcs designating altitudes, such projections being the same for all points on a given latitude, regardless of longitude. In accordance with the present invention, the projections of the celestial and terrestrial spheres are superposed and relatively rotated as a function of the sidereal time of the prime meridian and the estimated longitude of the navigator's position, the rotation being effected about a point common to the projections and corresponding to the axis of the poles. The extent of rotation corresponds to the algebraic sum of the sidereal time of the first meridian and the estimated longitude of the place or the local hour angle of the first point of Aries. This relative rotation of the two projections represents or compensates for the navigator's displacement in longitude from the prime meridian and for the earth's rotation in respect to the stars, or in other words, the sidereal time of the prime meridian. With the two projections thus oriented relative to each other, the local coordinates (altitude and azimuth) of an observed body can be directly read from the terrestrial projection. Conversely, if an unknown star has been observed at a given altitude, and in a given azimuth at a particular moment of time, by orienting the two projections in the manner indicated, the observed body can be easily identified by means of the coordinates inscribed on the terrestrial projection.

The terrestrial projection for any given latitude is divided into two portions representing respectively, that portion of the local hemisphere above the equator and that portion falling below the equator. The local hemisphere is defined, for present purposes, as that portion of the earth's surface lying on the observer's side of a great circle lying in a plane parallel to that of the observer's horizon, in other words, the local hemisphere may be defined as that hemisphere of which the observer is the pole.

In carrying forward these relationships, I utilize the two plates of the Rude star identifier and set these up for mechanical orientation in accordance with the determination of the local hour angle of the first point of Aries, which I calculate by a plurality of discs graduated for cooperation one with another.

With reference to the drawing I provide three superposed transparent plates held in fixed relation and spaced apart. The base plate 10 is of generally rectangular shape and has mounted upon it an intermediate plate 11 fixed at its four corners to the plate 10 by bolts 12 extending through spacing elements 13 at each of the four corners. A top plate 14 is spaced from the plate 11 by means of an arm 15 which is supported through spacing element 16 and 17 (see Fig. 3) from the plate 11. A bushing 18 held in position by the bolt 19 and nut 20 is provided with a plurality of shoulders and forms a further support for the plate 14 from the plate 10. By reason of one of its shoulders engaging the plate 14 and another of its shoulders engaging the plate 10. This bushing also provides a pivotal axle about which discs which are located between these fixed plates are rotatably mounted.

A disc 21 is pivotally mounted on the bushing 18 between the plate 10 and 11 while a pair of discs 22 and 23 are pivotally mounted on the bushing 18 between the plate 11 and 14. By reason of the shoulder 24, the plate 23 is supported independently of and slightly spaced from the disc 22 so that relative rotating movement of the two may be had without one causing turning of the other through friction.

A pair of L-shaped members 26 (see Fig. 4) are supported beneath the base plate 10 to slidably mount a plate member 27 while a disc 28 is pivotally mounted upon the head 29 of the axle 19 between the plate 10 and the plate 27.

The above-said series of plates and discs with the proper markings thereon afford a means for determining the local hour angle of the first point of Aries at any particular time of any particular day.

On the uppermost plate 14 I have provided a series of markings 30 which divide the plate 14 into different months corresponding to the calendar year. The lines 30 indicate the first day of the month and are spaced in accordance with the number of days in the month. The disc which is just beneath the plate 14 and is designated 23 has a set of markings thereon designated 31 which in Fig. 1 is viewed through the transparent plate 14 corresponding to the days of the month so that this disc may be set against any particular month according to the day of the month. This disc also has on it graduations designated 32 at its outer edge dividing the disc into three hundred and sixty degrees. The second disc 22 which is just below the disc 23 has designations 33 thereon corresponding to the hours in the day and is divided into twenty-four parts for the twenty-four hours and subdivided further if found desirable. The fixed plate 11 at a point adjacent the peripheral edge of the disc 22 has graduations 34 thereon corresponding to longitudes starting from the prime meridian 35 designated zero and running through 180 from west longitude on the right-hand side of Fig. 1 and 180 for east longitude on the left-hand side of Fig. 1. The time zone may also be indicated upon this scale as shown at 36. As an added convenience the angle in hours corresponding to the longitude may be also carried out from this plate 11 as shown at 37.

On the disc 21 between the plates 10 and 11 a longitude scale is provided through 180° as at 38 along the edge of this disc. This longitudinal scale is provided in two arcs running in opposite directions, the outer one being for west longitude and the inner one for east longitude. They each extend through a half circle. The datum line 39 is provided on the fixed base plate for cooperation with this disc 21.

Disc 28 has about its periphery graduations in degrees through 360° as indicated on one side as at 40 and on the other side as at 41 (see Figs. 4 and 1). The graduations on both sides agree so that zero on one side will be directly beneath the zero on the other side of the disc. On one side of the disc there will also be positioned as at 42 the stereographic projection of the navigational stars in the Northern Hemisphere while on the other side of the disc there will be the stereographic projection of the stars in the Southern Hemisphere (not shown). The disc is reversible by removing the bolt 19 and turning over this disc.

The plate 27 has upon it stereographic projections 44 which will be as provided in the "Rude star identifier" for different latitudes and a series of these plates will be supplied with the apparatus and the plate chosen which has the projection upon it closest to the latitude of the observer and this plate will be used. This plate is slidable in the channel provided at 45 and may be removed by removing the locking members 46 which are held beneath the bolt 47 so that the plates may be interchanged. A datum line 48 (see Fig. 4) is provided on the members 26 and a series of lines 49 provided on the plate so that the same may be adjusted relative to the datum line 48 for varying degrees of latitudes on either side of the latitude for which the projection has been drawn so as to compensate for slightly different latitudes.

In operation the graduation 31 which represents the days of the month are set beneath the datum line of the month in which the observation is taken. Thus, for instance as shown in Fig. 1, the apparatus is set for an observation on December 8. The date, of course, is the Greenwich civil date which is used. The next setting will be that of disc 22 and in this case the zero line 50 will be set against the longitude on the scale 34, which in this case is shown as 101 degrees. With the instrument so set it is now possible to read opposite the hour of the time the observation is made in degrees the Greenwich hour angle of the first point of Aries. Thus, assuming this to be at six fifty o'clock in the morning, 0650, the Greenwich hour angle as shown in the setting would be approximately 78 degrees.

In order to obtain the local hour angle of the first point of Aries it will be necessary to combine the Greenwich hour angle of the first point of Aries and the longitude of the observer which is accomplished by setting the longitude scale 38 so that the longitude of the observer will be at the datum line 39 and then with the zero line 51 as a new starting point the disc 28 is set opposite the zero line 51 corresponding to the degrees of the first point of Aries at the time of observation which in the assumption is 78 degrees. In this way the algebraic sum of the Greenwich hour angle of the first point of Aries and the longitude are combined so as to give the local hour angle and the proper setting to the disc 28 which has the stars thereon in their proper position relative to the pole. By this arrangement this disc 28 is oriented to its proper position relative to the stereographic projection of the earth's surface for the latitude of the observer as is provided by the Rude star identifier above indicated. Then by sliding the plate 27 to its proper position relative to the datum line 48 the azimuth and altitude of any of the stars on the projection plate 28 may be read off for identification or for pre-setting a sextant.

I claim:
1. A navigation apparatus comprising a member having a stereographic projection of the celestial hemisphere inscribed thereon, a second member having a stereographic projection of the local hemisphere inscribed thereon including a system of altitude and azimuth coordinates, said members being superposed, one being transparent and said members being relatively rotatable about a point common to said projections, and means including a plurality of relatively movable members pivoted about said common point, said members having graduations in terms of time, hour angle, and longitude for determining the position of the relative rotation of said projection members in accordance with a predetermined location of a celestial position which is taken from the first point of Aries.

2. A navigation apparatus comprising a member having a stereographic projection of the celestial hemisphere inscribed thereon, a second member having a stereographic projection of the local hemisphere inscribed thereon including a system of altitude and azimuth coordinates, said members being superposed, one being transparent and said members being relatively rotatable about a point common to said projections, and means including fixed and movable discs pivoted about said common point, said discs having graduations in terms of time, hour angle, and longitude for graphically calculating the local hour angle of the first point of Aries for setting the relative rotatable position of said projection members.

3. A navigation apparatus as set forth in claim 1 wherein said means comprises at least four superposed disks some of which are relatively movable.

4. A navigation apparatus as set forth in claim 1 wherein said means comprises three fixed members and three members rotatable relative to said member and relative to each other.

5. A navigation apparatus as set forth in claim 1 wherein said means comprises at least four superposed members some of which are relatively movable, some of said members being movable to provide the sidereal time.

6. A navigation apparatus as set forth in claim 1 wherein said means comprises at least four superposed members some of which are relatively movable, some of said members being movable to provide the sidereal time and others of said members serving as a means to combine said sidereal time and the longitude to provide the local hour angle of the first point of Aries.

WALDO EMERSON RANDALL, Jr.

REFERENCES CITED

The following references are of record in the file of this patent:

UNITED STATES PATENTS

| Number | Name | Date |
|---|---|---|
| 496,993 | Bristol | May 9, 1893 |
| 1,401,446 | Rude | Dec. 27, 1921 |
| 1,873,595 | Johnson | Aug. 23, 1932 |
| 2,219,378 | Booth | Oct. 29, 1940 |
| 2,337,545 | Collins | Dec. 28, 1943 |

FOREIGN PATENTS

| Number | Country | Date |
|---|---|---|
| 539,297 | Germany | 1931 |